United States Patent

Mizuhara

[11] Patent Number: 5,152,449
[45] Date of Patent: Oct. 6, 1992

[54] EDGE BRAZE OF METAL END CAP TO CERAMIC CYLINDER

[75] Inventor: Howard Mizuhara, Hillsborough, Calif.

[73] Assignee: Morgan Crucible Company PLC, Great Britain

[21] Appl. No.: 548,394

[22] Filed: Jul. 5, 1990

[51] Int. Cl.⁵ .............................................. B23K 31/02
[52] U.S. Cl. .................................. 228/124; 228/263.12
[58] Field of Search ..................... 228/122, 124, 263.12

[56] References Cited

U.S. PATENT DOCUMENTS

| | | | |
|---|---|---|---|
| 4,011,099 | 3/1977 | Gutsche | 51/317 |
| 4,273,593 | 6/1981 | Mastrangelo | 148/24 |
| 4,436,241 | 3/1984 | Lipperts | 228/124 |
| 4,459,328 | 7/1984 | Mizuhara | 427/190 |
| 4,667,871 | 5/1987 | Mizuhara | 228/122 |
| 4,684,579 | 8/1987 | Mizuhara | 228/122 |
| 4,785,989 | 11/1988 | Mizuhara et al. | 228/122 |
| 4,835,344 | 5/1989 | Iyogi et al. | 228/122 |
| 4,903,885 | 2/1990 | Schwarzbauer | 228/263.12 |
| 4,917,642 | 4/1990 | Nakahashi et al. | 228/122 |

Primary Examiner—Richard K. Seidel
Assistant Examiner—James Miner
Attorney, Agent, or Firm—McCubbrey, Bartels, Meyer & Ward

[57] ABSTRACT

A double-ended ceramic cylinder has a thin metal end cap edge-brazed to each end by means of a brazing paste containing active metal applied to the end surfaces of the cylinder prior to placing the end caps on the ceramic cylinder. Use of the brazing paste ensures that the entire end surfaces of the ceramic cylinder are coated with brazing metal.

3 Claims, 1 Drawing Sheet

EDGE BRAZE OF METAL END CAP TO CERAMIC CYLINDER

This invention concerns the edge brazing of a cylindrical metal end cap to a ceramic cylinder for use, for example, in a vacuum switch. The wall thickness of the end cap is thinner than the wall thickness of the ceramic cylinder. The diameter of the end cap is about halfway between the inside and outside diameters of the ceramic cylinder so that when the end cap is placed concentrically on the end of the ceramic cylinder, the end cap is substantially equidistant from inside and outside walls of the ceramic cylinder. Brazing is accomplished by means of a ring-shaped preform of a suitable active brazing alloy placed between the ceramic cylinder and the end cap. The preform is thin, say, six mils, and has about the same inside and outside diameters as the ceramic cylinder. It is desirable that, after brazing, the brazing alloy form a suitable fillet at the junction of the end cap and cylinder. It is also desirable that the brazing alloy wet the entire end surface of the ceramic cylinder so that any thermal-mismatch stress between the metal and the ceramic be distributed across the entire end surface of the ceramic cylinder.

A problem with the use of a preform of active brazing alloy is that it does not always wet the entire end surface of the ceramic cylinder. This could be due to too fast a heating cycle; or, in the case of the lower end cap, parts of the preform sag away from the ceramic as the preform melts.

This invention provides a means of brazing an end cap to a ceramic cylinder which ensures that the entire end surface of the cylinder will be wet by the brazing alloy. Here, instead of using a brazing alloy preform, a brazing paste is applied, for example, by screening, extrusion and the like, to the end surface of the ceramic cylinder. When the brazing metal in the paste melts, it will wet and coat the entire end surface of the cylinder, even for a fast heating cycle and even on the lower end surface.

In the drawing

A brazing paste for use in this invention consists of powdered brazing metal disposed in a liquid vehicle. An active metal is included in the brazing paste, preferably titanium. And preferably the titanium is present in the paste as the hydride.

Figure 1:
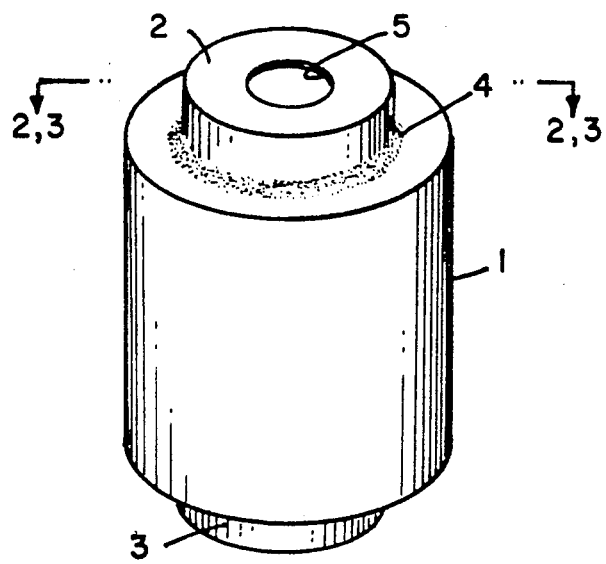
FIG. 1 is a view of a ceramic cylinder having an end cap brazed at each end, such as would be used in a vacuum switch.

One embodiment of a brazed assembly in accordance with this invention, as shown in FIG. 1, comprises a ceramic cylinder 1 having a top end cap 2 and a bottom end cap 3 brazed thereto, there being a braze fillet 4 at the junction of the cylinder and end cap. In one example, ceramic cylinder 1 was made of alumina, was 3" long, had an outside diameter of 4" and an inside diameter of 3½" for a wall thickness of ¼". End caps 2 and 3 were made of 45 mil thick stainless steel and were shaped like a shallow cup with a hole 5 therethrough. End caps 2 and 3 were 3¾" in diameter and had a height of ⅜". In order to braze end caps 2 and 3 to cylinder 1, a brazing paste was used. The brazing paste consisted of brazing metal powder dispersed in a liquid vehicle. Such a brazing paste is disclosed in U.S. Pat. No. 4,919,7390. The paste was applied to both ends of cylinder 1 and then end caps 2 and 3 were concentrically positioned thereon. The assembly of cylinder and end caps was vertically held in a suitable jig throughout the brazing cycle.

Figure 2:
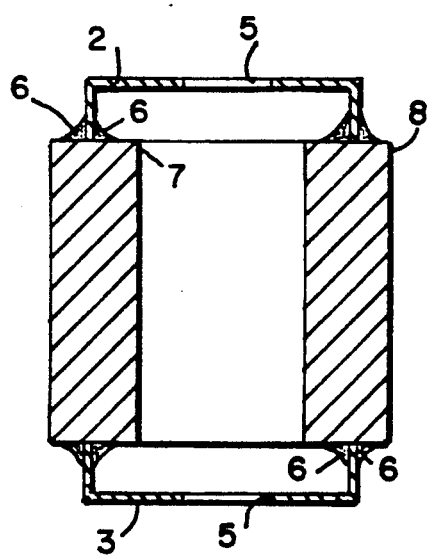
FIG. 2 is a sectional view showing an example of a poor braze in which the entire end surface of the cylinder is not coated.

FIG. 2 shows an example of a poor braze. Braze fillet 6 rides up a little too high on end caps 2 and 3 and the braze coating does not extend all the way out to inner edge 7 and/or outer edge 8 of cylinder 1.

Figure 3:
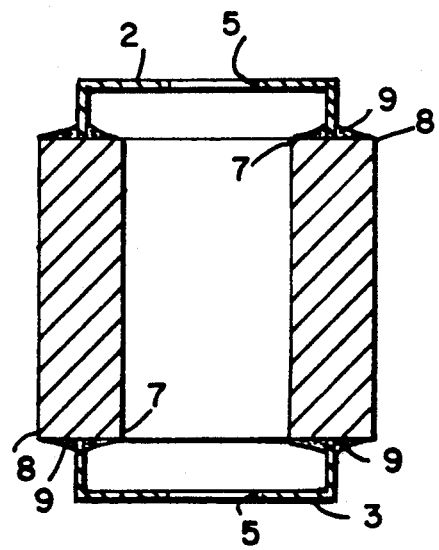
FIG. 3 is a sectional view showing a good braze, the entire end surface being coated by braze metal.

FIG. 3 shows an example of a good braze. Fillet 9 is not quite as high as in FIG. 2 and the braze coating extends all the way out to inner edge 7 and outer edge 8 of cylinder 1. Thus the entire end surfaces of cylinder 1 are coated with brazing metal.

EXAMPLE 1

In this example, the brazing metal that was used consisted of minus 325 mesh powder of Ag-Cu-Sn alloy mixed with minus 325 mesh titanium hydride powder so that the brazed composition consisted of, in weight percent, 63 Ag, 34.25 Cu, 1 Sn, 1.75 Ti. The paste consisted of 90% by weight of powder and 10% by weight of a screening oil. The paste was applied to the ends of alumina cylinder 1 by screening through an 80 mesh screen at a distance of 60 mils. Two coatings were applied to yield a 12 mil layer of dried paste, which is equivalent to about a 6 mil preform thickness on melting. Prior to coating the ends of cylinder 1, cylinder 1 was heated at 1500 to 1600° C. in order to heal any grinding surface flaws that may have existed on the bonding surfaces of cylinder 1. End caps 2 and 3, made of type 430 stainless steel, were assembled to coated cylinder 1, and the assembly was brazed in a vertical position at 825° C. under $10^{-5}$ torr vacuum. An excellent braze resulted, with complete coverage of the end surfaces of cylinder 1.

EXAMPLE 2

In this example, the brazing metal consisted of minus 325 mesh powder of an alloy of, in weight percent, 59.5 Ag, 27.8 Cu, 12.7 In, mixed with 1% by weight of minus 325 mesh $TiH_2$. The paste consisted of 90% by weight brazing metal powder and 10% by weight screening oil. The end caps were made of cupronickel (70% Cu, 30% Ni). The braze was made at 720° C. under $10^{-5}$ torr vacuum. An excellent braze resulted which met the helium leak test of better than $10^{-9}$ cc/sec leak rate.

EXAMPLE 3

This example was similar to that of Example 2 except that the end caps were made of nickel-plated type 1010 steel instead of cupronickel. Also, grinding flaws were eliminated by lapping off about 3 mols from each face, instead of firing at 1600° C.

EXAMPLE 4

In this example the metal powder consisted of 97% by weight of minus 325 mesh atomized powder of an alloy of, in weight percent, 94.6 Cu, 2.1 Al, 3.3 Si. and 3% by weight of minus 325 mesh $TiH_2$. The paste consisted of 90% by weight of the metal powder and 10% by weight of screening oil. The end caps were made of Kovar, an Iron-nickel-cobalt alloy made by Westinghouse Electric Corporation. The brazing was at 1030° C. under $10^{-5}$ torr vacuum. An excellent braze resulted.

I claim:

1. The method of making an assembly of an alumina cylinder having two ends, each end having a metal end cap edge-brazed thereto, comprising the steps of: coating each end surface of the cylinder with a brazing paste, the brazing paste consisting of finely powdered brazing metal disposed in a liquid vehicle; concentrically disposing said end caps on the coated ends of the cylinder so that the end caps are substantially equidistantly spaced from the inner and outer edges of the cylinder; placing the assembly of cylinder and end caps in a vertical position in a vacuum furnace; and heating the assembly under vacuum to braze the end caps to the cylinder in order to yield a brazed assembly in which the entire end surfaces of the ceramic cylinder are coated with braze metal; and wherein the end caps are made of stainless steel and the metals in the brazing paste are silver, copper, tin, titanium hydride.

2. The method of making an assembly of an alumina cylinder having two ends, each end having a metal end cap edge-brazed thereto, comprising the steps of: coating each end surface of the cylinder with a brazing paste, the brazing paste consisting of finely powdered brazing metal disposed in a liquid vehicle; concentrically disposing said end caps on the coated ends of the cylinder so that the end caps are substantially equidistantly spaced from the inner and outer edges of the cylinder; placing the assembly of cylinder and end caps in a vertical position in a vacuum furnace; and heating the assembly under vacuum to braze the end caps to the cylinder in order to yield a brazed assembly in which the entire and surfaces of the ceramic cylinder are coated with braze metal; and wherein the end caps are made of cupronickel or nickel-plated steel and the metals in the brazing paste are silver, copper, indium, titanium hydride.

3. The method of making an assembly of an alumina cylinder having two ends, each end having a metal end cap edge-brazed thereto, comprising the steps of: coating each end surface of the cylinder with a brazing paste, the brazing paste consisting of finely powdered brazing metal disposed in a liquid vehicle; concentrically disposing said end caps on the coated ends of the cylinder so that the end caps are substantially equidistantly spaced from the inner and outer edges of the cylinder; placing the assembly of cylinder and end caps in a vertical position in a vacuum furnace; and heating the assembly under vacuum to braze the end caps to the cylinder in order to yield a brazed assembly in which the entire end surfaces of the ceramic cylinder are coated with braze metal; and wherein the end caps are made of iron-nickel-cobalt alloy and the metals in the brazing paste are copper, aluminum, silicon, titanium hydride.

* * * * *